United States Patent [19]

Sumser et al.

[11] Patent Number: 5,454,225
[45] Date of Patent: Oct. 3, 1995

[54] EXHAUST GAS TURBOCHARGER FOR AN INTERNAL COMBUSTION ENGINE

[75] Inventors: Siegfried Sumser; Wolfgang Erdmann, both of Stuttgart; Erwin Schmidt, Baltmannsweiler; Horst Hanauer, Althutte; Klaus Wunderlich, Waiblingen, all of Germany

[73] Assignee: Mercedes-Benz A.G., Stuttgart, Germany

[21] Appl. No.: 301,807

[22] Filed: Sep. 7, 1994

[30] Foreign Application Priority Data

Sep. 9, 1993 [DE] Germany ............ 43 30 487.7

[51] Int. Cl.[6] ............................................. F02B 37/12
[52] U.S. Cl. ................................. 60/602; 415/166
[58] Field of Search ......................... 60/602; 415/116, 415/151, 166

[56] References Cited

U.S. PATENT DOCUMENTS

| | | | |
|---|---|---|---|
| 4,653,275 | 3/1987 | Sumser et al. | 60/602 |
| 4,776,168 | 10/1988 | Woollenweber | 60/602 |
| 4,867,637 | 9/1989 | Hayama . | |
| 4,886,416 | 12/1989 | Wunderlich | 60/602 |
| 4,894,990 | 1/1990 | Tsubouchi | 60/602 |
| 5,372,485 | 12/1994 | Sumser et al. | 415/166 |

FOREIGN PATENT DOCUMENTS

| | | |
|---|---|---|
| 0598174 | 5/1994 | European Pat. Off. . |
| 126796 | 8/1977 | German Dem. Rep. . |
| 2843202 | 4/1980 | Germany . |
| 3302186 | 7/1984 | Germany . |
| 3322436 | 1/1985 | Germany . |
| 3427715 | 5/1985 | Germany . |
| 3441115 | 1/1986 | Germany . |
| 3504374 | 8/1986 | Germany . |
| 3833906 | 5/1989 | Germany . |
| 691144 | 5/1953 | United Kingdom . |

Primary Examiner—Michael Koczo
Attorney, Agent, or Firm—Klaus J. Bach

[57] ABSTRACT

In an exhaust gas turbocharger for an internal combustion engine comprising a compressor and an exhaust gas turbine mounted on a common shaft, the exhaust gas turbine includes a rotor with radial and semi-axial flow inlet areas and a single-flow duct surrounding the rotor and having port regions in the form of annular nozzle structures with guide vanes disposed adjacent each flow inlet area which are divided from one another by a ring of streamlined shape which is mounted to the guide vanes of one of the adjacent nozzle structures, said guide vanes having at least portions which are movable for adjusting the flow cross-section of the respective annular nozzle structures for controlling the flow through the radial and semi-axial flow inlet areas.

11 Claims, 4 Drawing Sheets

EXHAUST GAS TURBOCHARGER FOR AN INTERNAL COMBUSTION ENGINE

BACKGROUND OF THE INVENTION

The invention relates to an exhaust gas turbocharger of an internal combustion engine in which the gas flow through the exhaust gas turbine can be controlled depending on engine operating conditions.

German OfFenlegungsschrift 3,322,436 discloses an exhaust gas turbocharger of an internal combustion engine of the type with which the present invention is concerned, The turbine stage of the exhaust gas turbocharger has a single-flow, spiral flow duct which leads to the turbine rotor and, adjacent the rotor, terminates in a port region including an annular nozzle structure disposed radially around the rotor. The port region of the flow duct includes a variable guide vane structure with pivotable guide vanes by means of which the low cross-section of the annular nozzle can be adjusted.

With regard to the general background, attention is also drawn to the publications German Offenlegungsschrift 2,843,202, German Patent 3,427,715, German Patent 3,441,115, German Offenlegungsschrift 3,833,906 and East German Patent 126,796.

It is the principal object of the present invention to provide a single-flow exhaust gas turbine in such a way that greater flexibility and a broader spectrum of use in comparison with the known state of the art is possible.

SUMMARY OF THE INVENTION

In an exhaust gas turbocharger for an internal combustion engine comprising a compressor and an exhaust gas turbine mounted on a common shaft, the exhaust gas turbine includes a rotor with radial and semi-axial flow inlet areas and a single-flow duct surrounding the rotor and having port regions in the form of annular nozzle structures with guide vanes disposed adjacent each flow inlet area which are divided from one another by a ring of streamlined shape which is mounted to the guide vanes of one of the adjacent nozzle structures, said guide vanes having at least portions which are variable for adjusting the flow cross-section of the respective annular nozzle structures for controlling the flow through the radial and semi-axial flow inlet areas.

An advantage of the invention resides in the fact that a single-flow turbine casing can be made relatively large, thereby making it possible to achieve low flow velocities and hence lower flow losses in its flow duct. The flow acceleration takes place over short lengths of travel within the guide vane structure and, as a result, it is possible to achieve favorable turbine eficiencies in the design positions of the guide vane structures.

The single-flow turbine casing can be produced as a spiral casing or as a pure collecting space. At the coupling point of the guide vane structures guiding the radial and the semi-axial inflow to the rotor, a flow guide ring contoured in a manner to streamline the gas flow is, according to the invention, provided to shape the duct so as to improve guidance of the gas flow. This ring does not have to be symmetrical with respect to the axis of rotation of the rotor but, in a particular spiral casing, can also have a variable (e.g. spiral) configuration over the circumference.

The ring according to the invention divides the annular nozzle-like port region of the single-flow flow duct into two annular nozzle structures, one for the radial inflow to the rotor and one for the semi-axial inflow to the rotor. Thus, an optimum variable turbine geometry for a single-flow exhaust turbine is formed in which example the vanes of the semi-axial guide vane structure are designed for start-up operation (rapid acceleration of the turbine) and the variable radial guide vane structure is designed for part-load and full-load operation.

The guide vane structure adjustment mechanism according to the invention makes it possible, by varying the flow cross-section by means of the adjustable guide vane structure, to use the latter in an advantageous manner also as an engine brake (exhaust brake). Given an appropriate choice of the guide vane structure parameters, the guide vane structure can be designed in such a way that, apart from gap flows, the gas flow can be shut of completely by appropriate rotation of the rotatable guide vane structure. Also, in an intermediate position of the rotatable guide vane structure, both radial and semi-axial inflows to the rotor are possible.

The arrangement according to the invention wherein the flow guide ring is positionable by way of a firmly installed flow guide structure of the radial or semi-axial vane structures is a preferred embodiment of the invention.

If at least one of the annular nozzle arrangements can be fully shut of by an adjustable guide vane structure, either only radial or only semi-axial exhaust gas admission to the rotor becomes possible by adjustment of the guide vane structure.

With the arrangement according to the invention only a single divided guide vane structure is required, this guide vane structure being capable of controlling both the radial and the semi-axial exhaust gas to the rotor.

The invention is explained in greater detail below with reference to three exemplary embodiments on the basis of the attached drawings.

DESCRIPTION OF THE PREFERRED EMBODIMENTS

Figure 1:
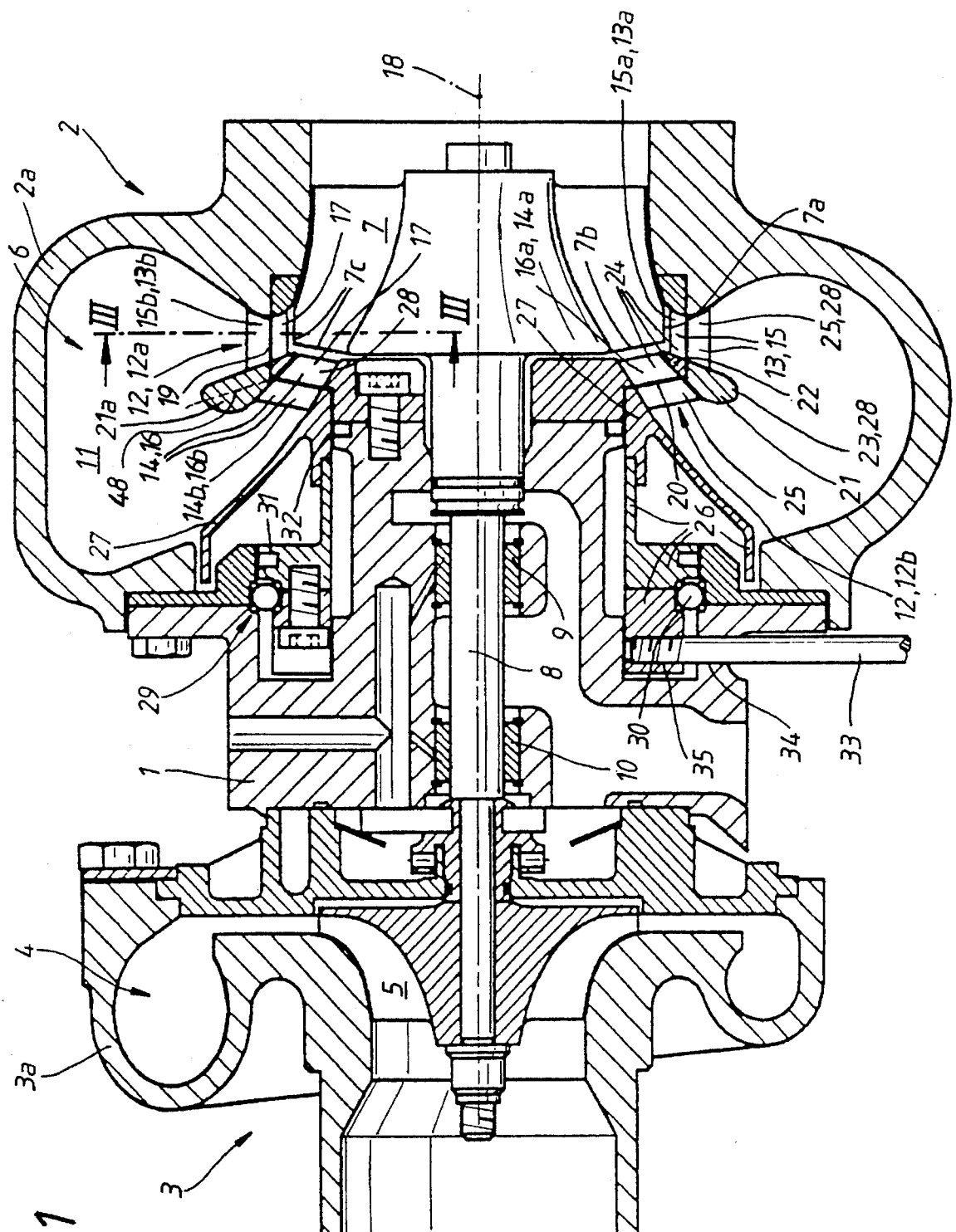
FIG. 1 relates to a first exemplary embodiment showing a vertical axial cross-section through an exhaust gas turbocharger with a single-stage exhaust turbine having a flow duct with an outlet port region including a ring contoured in a streamlined manner and arranged in such a way that two annular nozzles are formed in the outlet port region with a variable guide vane structure being arranged in each annular nozzle.

FIG. 1 shows a vertical axial cross-section through an exhaust gas turbocharger which comprises a housing 1, a turbine stage 2 and a compressor stage 3 in a manner known in principle.

Flanged to the housing 1 is a single-low spiral compressor housing 3a with a flow duct 4 which surrounds a radial impeller 5 of the compressor stage 3, and a single-low spiral turbine casing 2a with a flow duct 6 which surrounds a rotor 7 of the turbine stage 2, the flow through the rotor being radial and semi-axial. The rotor 7 has a radial flow inlet area 7a and a semi-axial low inlet area 7b.

The radial impeller 5 and the rotor 7 are seated on a common shaft 8, which is supported in the casing 1 by means of radial bearings 9 and 10.

The single-flow spiral low duct 6 comprises a flow passage 11 for the exhaust gas flow which is admitted radially and semi-axially to the rotor 7 in a port region 12 including an annular nozzle structure having annularly arranged nozzles 12a and 12b with radial and semi-axial flows. The port region includes two variable, continuously adjustable divided guide vane structures 13 and 14 each having divided guide vanes 15 and 16, the inner ends 17 of the guide vanes 13 and 14 adjacent the rotor periphery 7c having only a small clearance from the rotor. The rotor periphery 7c comprises the radial flow inlet area 7a and the semi-axial flow inlet area 7b.

The guide vanes 15 and 16 of the divided guide vane structures 13 and 14 with guide vane structure parts 13a and 13b and 14a and 14b are divided at intersecting dividing surfaces into guide vane parts 15a, 15b and 16a, 16b, one of the dividing surfaces being the circumferential surface 19 of a cylinder extending concentrically to the axis 18 of the turbine and the other dividing surface being the lateral surface 20 of a cone, the associated cone tip of which lies on the axis 18 of the rotor 7.

Arranged in the region of the circle of intersection of the two dividing surfaces 19 and 20 of the divided guide vanes 13 and 14 is a divided ring 21 contoured in a streamlined manner and having ring parts 22 and 23, with ring part 22 being firmly connected to the fixed guide vane parts 15a, 16a and ring part 23 being firmly connected to the rotatable guide vane parts 15b and 16b. The ring 21 has a streamlined shape with a cross-section of decreasing axial and radial dimensions over its circumferential length in the direction of flow, and it has a nose region 21a which projects into the flow duct 6.

The divided guide vanes 15, 16 of the guide vane structures 13, 14 and the divided ring 21 form a divided guide vane ring 28 which consists of a fixed guide vane ring part 24 comprising guide vane parts 15a and 16a (guide vane structure parts 13a, 14a) and ring part 22, and of a guide vane ring part 25 associated with ring part 22 and being rotatable concentrically with respect to the axis 18 of rotation of the rotor 7 and comprising guide vane parts 15b and 16b (guide vane structure parts 13b, 14b) together with ring part 23. The rotatable guide vane ring part 25 is arranged on the inlet side of the port region 12 and the fixed guide vane ring part 24 is arranged on the port exit side of the port region 12.

Rotation of the guide vane ring part 25 is performed by means of a hub 26 to which a conical hub part 27 is attached.

The hub 26 is supported in the casing 1 by means of a ring wire-race ball-bearing 29 having ceramic or steel balls 30.

The casing 1 and the hub 26 are sealed off from the gas side by means of rectangular section rings 31 and 32.

The hub 26 is rotated by means of a pin 33 which extends through a slot 34 in the casing 1 and is firmly connected to the hub 26 by means of a thread 35.

The pin 33 is connected to an actuator (not shown) which varies the position of the hub 26 and hence the position of guide vane ring part 25 mounted thereon as a function of operating parameters of the internal combustion engine.

Figure 2:
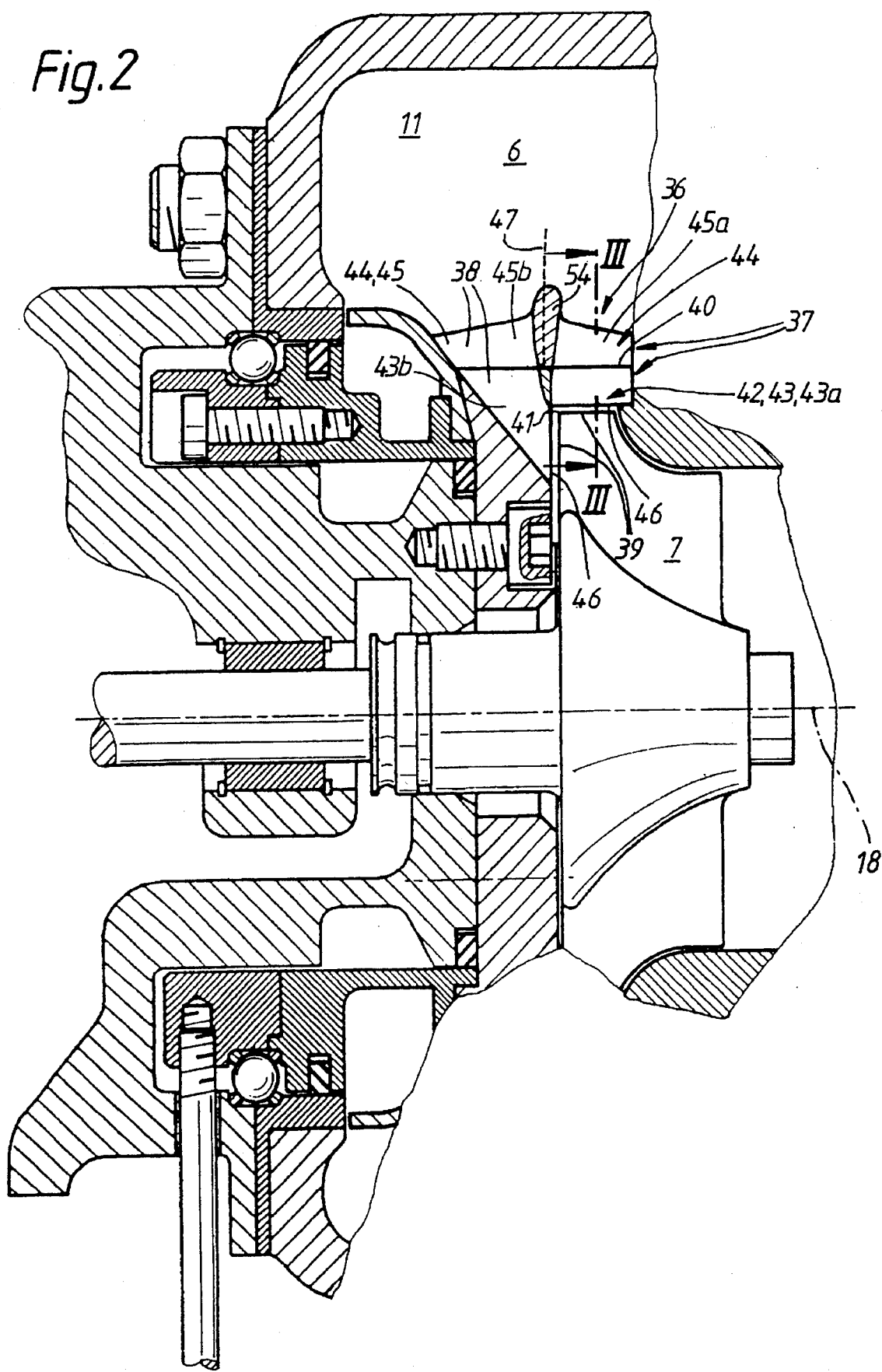
FIG. 2 relates to a second exemplary embodiment showing a partial vertical axial cross-section through an exhaust turbocharger with a guide vane structure according to the invention.

FIG. 2 is a partial vertical axial sectional view of an exhaust gas turbocharger similar to that shown in FIG. 1. Identical components are designated by the same reference numerals.

The flow channel 11 with its outlet region 36 in the form of an annular nozzle admits exhaust gas radially and semi-axially to the rotor 7. Situated in the outlet region 36 in the form of an annular nozzle is a variable, continuously adjustable divided guide vane structure 37 with divided guide vanes 38 which are divided along a circumferential surface 40 of a cylinder disposed concentrically to the axis 18 of rotation of the rotor 7. The divided guide vane structure 37 consists of a fixed guide vane structure part 42 with guide vane parts 43 and guide vane sections 43a and 43b and of a guide vane structure part 44 associated with the fixed part but being rotatable concentrically to the axis 18 of rotation of the rotor 7 and having guide vane parts 45 and guide vane sections 45a and 45b, the rotatable guide vane structure part 44 being arranged on the inflow side of the outlet region 36 and the fixed guide vane structure part 42 being arranged on the exit-flow side of the outlet region 36.

The exit-flow end 46 of the fixed guide vane structure part 42 is matched to the contour of the rotor periphery 39, which is disposed adjacent the outlet region 36 and comprises an annular surface (semi-axial flow inlet area) extending radially relative to the axis 18 of the rotor 7 and the circumferential surface of a cylinder adjacent the outlet contour of the annular surface and extending concentrically with respect to the axis 18 of the rotor 7 (radial flow inlet area)

The dividing surface 40 in the form of a circumferential surface of a cylinder divides the guide vane sections 43b, 45b guiding the semi-axial inflow to the rotor 7 relatively further towards the profiled nose than the guide vane sections 43a, 45a guiding the radial inflow.

By arranging the guide vane sections 43a, 45a and 43b, 45b at a different pitch, either the radial or the semiaxial inflow to the rotor 7 can be opened up when the guide vane structure part 44 is rotated. Between the guide vane sections 43a, 45a and 43b, 45b there is a divided streamlined ring 54 similar to that shown in FIG. 1.

Figure 3:
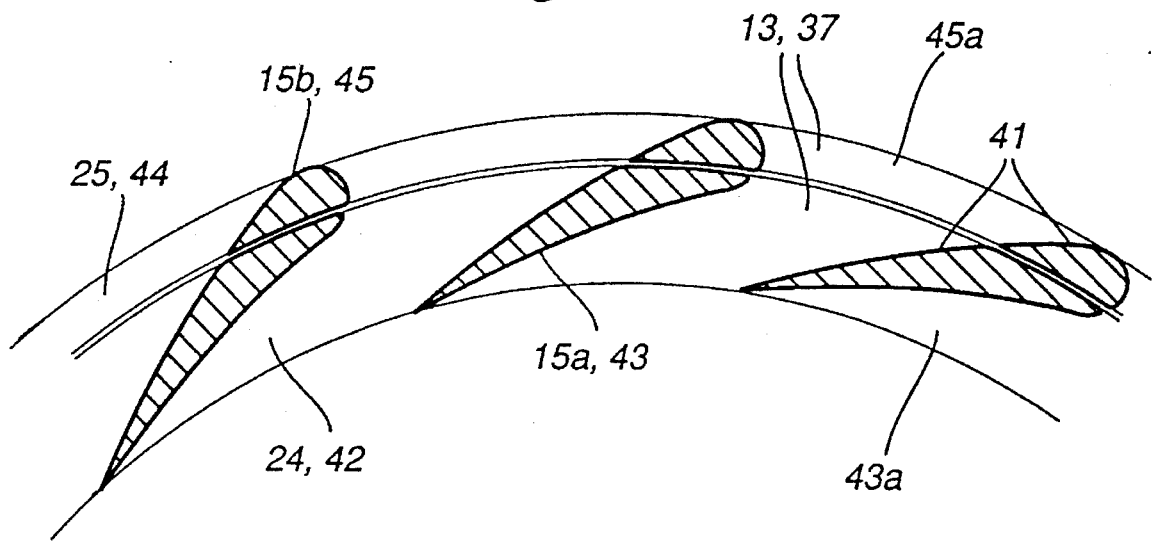
FIG. 3 is a sectional view along lines III—III of FIGS. 1 and 2 showing the guide vane positions for fully opened radial inflow to the rotor of the exhaust gas turbine.

FIG. 3 shows a cross-section III—III taken through the divided guide vane structure 13 shown in FIG. 1 or through the guide vane sections 43a, 45a of the divided guide vane structure 37 shown in FIG. 2, wherein the radial inflow to the rotor 7 is completely open. Identical components from FIGS. 1 and 2 are denoted by identical reference numerals.

Figure 4:
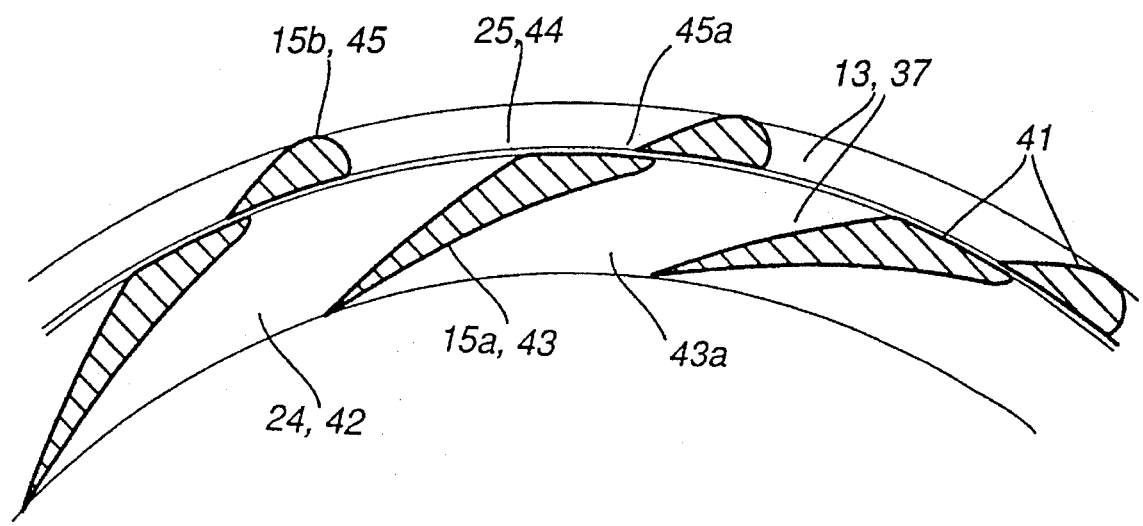
FIG. 4 is a sectional view similar to that shown in FIG. 3 for a position of the radial guide vane structure with partially shut-of radial inflow to the rotor of the exhaust gas turbine.
Figure 5:
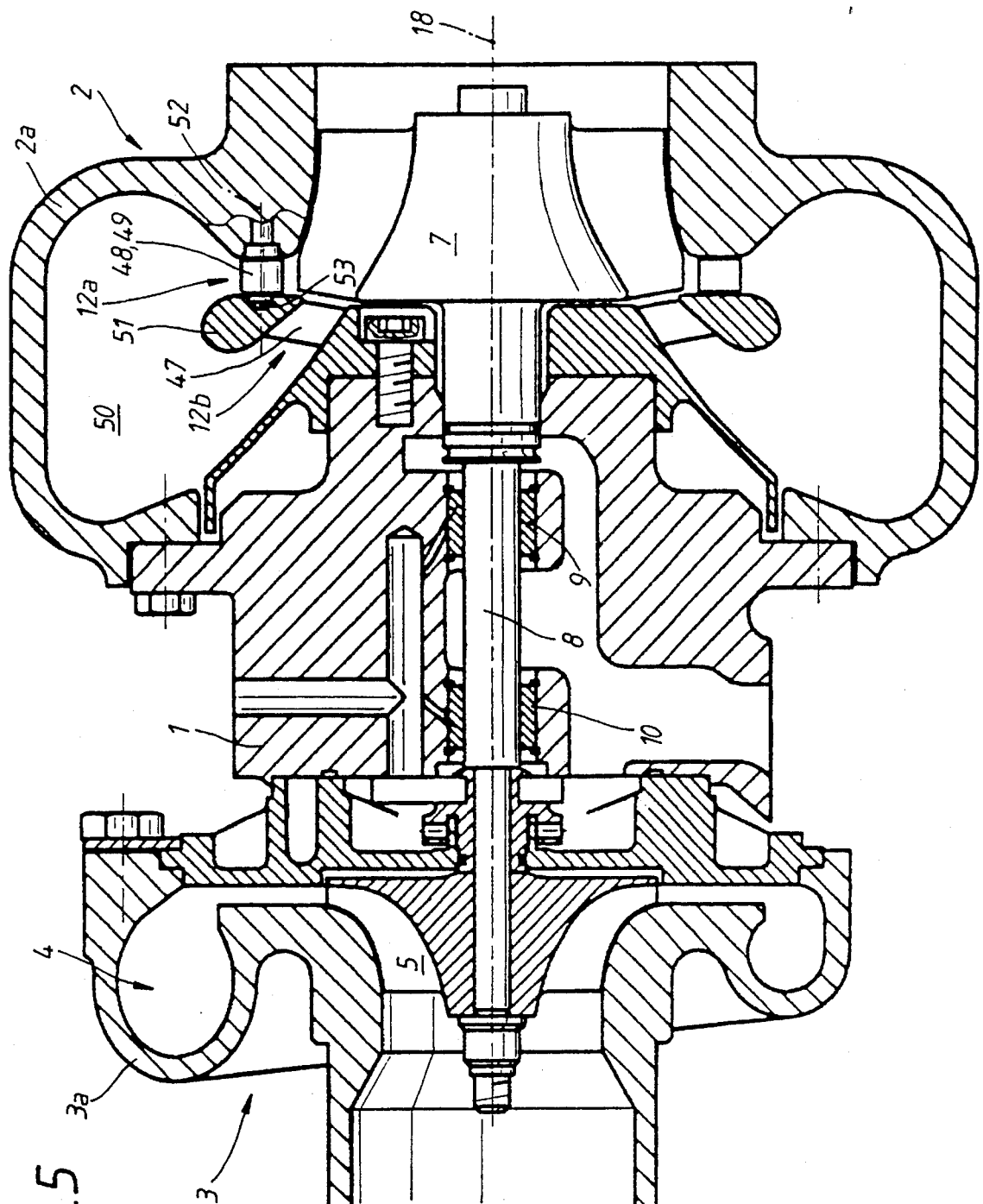
FIG. 5 relates to a third exemplary embodiment showing a vertical axial cross-section through an exhaust gas turbocharger with a fixed guide vane structure in the semi-axial annular nozzle and a guide vane structure with pivotable guide vanes in the radial annular nozzle.

FIG. 4 shows, in a section similar to that shown in FIG. 3, a position of the divided guide vane structure 13 or 37 in which radial inflow to the rotor 7 is partially shutoff FIG. 5 shows a third embodiment giving a vertical axial cross-section of an exhaust turbocharger with a fixed guide vane structure 47 in the semi-axial annular nozzle 12b and a guide vane structure 48 with pivotable guide vanes 49 disposed in the radial annular nozzle 12a. Identical components from FIGS. 1 to 4 ape denoted by identical reference numerals. A single-flow flow duct 50 is designed as an annular collecting space. A ring 51 contoured in a streamlined manner has a given cross-section over its circumference so as to be symmetrical with respect to the axis 18 of rotation of the rotor 7. The streamlined ring 51 is fixed by way of the fixed guide vane structure 47 arranged in the semi-axial annular nozzle 12b.

The adjusting mechanism for the guide vanes 49 pivotable about a guide vane longitudinal axis 52 is known in principle and is therefore not explained in detail. The adjusting mechanism shown in FIG. 5 is improved in comparison with prior art arrangements in that, to reduce the gap losses, the guide vanes 49 are no longer cantilevered as in the prior art arrangements but are additionally supported on the other side in bearings 53 in the ring 51.

In an embodiment of the invention in accordance with FIG. 2, the two guide vane structure sections 43a, 45a and 43b, 45b respectively guiding the radial and the semi-axial inflow can also be movable independently of one another and the radial and semi-axial inflow to the rotor 7 can thus also take place simultaneously. For intentional braking of the engine, it is furthermore possible for both the radial and the semi-axial inflow to be shut of (exhaust brake). In an embodiment of this kind, the guide vane structure 37 is divided along a dividing plane 47 extending approximately radially, in the region of a circumferential edge 41 of the rotor 7 (in accordance with FIG. 2). Here, a corresponding adjusting mechanism (e.g. similar to that shown in FIGS. 1 and 2) must be provided for the independent adjustment of the two guide vane structure parts.

In a similar manner, the ring part 23 in the design shown in FIG. 1 can be divided in a radial plane 48 in addition to the existing division, thereby providing for two pivotable guide vane structure parts by means of which the radial and the semi-axial inflows to the rotor 7 can be controlled independently of one another, as a function of operating parameters of the internal combustion engine for instance.

In a further embodiment of the invention, the fixed guide vane structure part can be arranged on the inflow side and the pivotable guide vane structure part can be arranged on the exit-flow side.

It is furthermore also possible for the guide vanes of the guide vane structure guiding the semi-axial inflow to be pivotable about their individual vane axes and for the guide vanes of the guide vane structure guiding the radial inflow to be of fixed design.

What is claimed is:

1. An exhaust gas turbocharger for an internal combustion engine comprising a compressor and an exhaust gas turbine mounted on a common shaft, said exhaust gas turbine including a rotor with radial and semi-axial flow inlet areas and a single-flow duct surrounding said rotor and having port regions in the form of annular nozzle structures disposed adjacent each flow inlet area of said rotor, and at least one variable guide vane structure with guide vanes arranged in said flow duct for controlling the effective flow cross-section of the annular nozzle structures, and a ring of streamlined shape disposed in said flow duct between said radial and semi-axial flow areas so as to divide the two areas and define said annular nozzles at opposite sides thereof, said ring being mounted on at least one of the guide vane structures of said radial and semi-axial annular flow areas.

2. A turbocharger according to claim 1, wherein said guide vane structures are each arranged between said streamlined ring and one of the side walls of said flow duct and are adjustable independently of one another.

3. A turbocharger according to claim 1, wherein said streamlined ring is divided concentrically to the axis of rotation of the rotor so as to provide two ring sections which are movable relative to one another.

4. A turbocharger according to claim 1, wherein said streamlined ring has an outer contour which is rotationally symmetrical in relation to the axis of rotation of the rotor.

5. A turbocharger according to claim 1, with a flow duct of spiral shape, wherein the cross-section of said streamlined ring is contoured so as to decrease in its axial and radial extent relative to the axis of rotation of the rotor along its circumference, in the direction of gas flow, and has a nose region projecting into the spiral flow duct.

6. A turbocharger according to claim 1, wherein said guide vane structures are divided, comprising a fixed guide vane structure part and a rotatable guide vane structure part arranged in said annular nozzles, at least one of the divided guide vane structures being adapted to vary the flow cross-section of one of the annular nozzles.

7. A turbocharger according to claim 1, wherein one of the guide vanes of the guide vane structures guiding the radial inflow to the rotor of and the guide vanes of the guide vane structure guiding the semi-axial inflow to the rotor are of one-piece design and designed to be pivotable about a vane longitudinal axis.

8. A turbocharger according to claim 1, wherein the guide vane structure is divided by two intersecting dividing surfaces, one dividing surface being the circumferential surface of a cylinder which extends concentrically to the axis of rotation of the rotor and the other dividing surface being the lateral surface of a cone, the associated cone tip of which lies on the axis of rotation of the rotor.

9. A turbocharger according to claim 1, wherein at least one of said annular nozzles is capable of being closed completely by the adjustable guide vane structure.

10. A turbocharger according to claim 1, wherein the ends of the divided guide vane structures adjacent the two flow inlet areas of the rotor are matched to the contour of a rotor periphery.

11. A turbocharger according to claim 1, wherein said streamlined ring is divided into two relatively rotatable parts, and also at least one of the adjacent vane structures is divided circumferentially into a first part connected to one of said relatively movable parts of said divided ring and a second part connected to the other part of said divided ring, and means are provided for rotating said one part of said ring with the vane structure part connected thereto relative to the other vane structure part for controlling the flow cross-section of said vane structure.

* * * * *